United States Patent Office 2,694,155
Patented Nov. 9, 1954

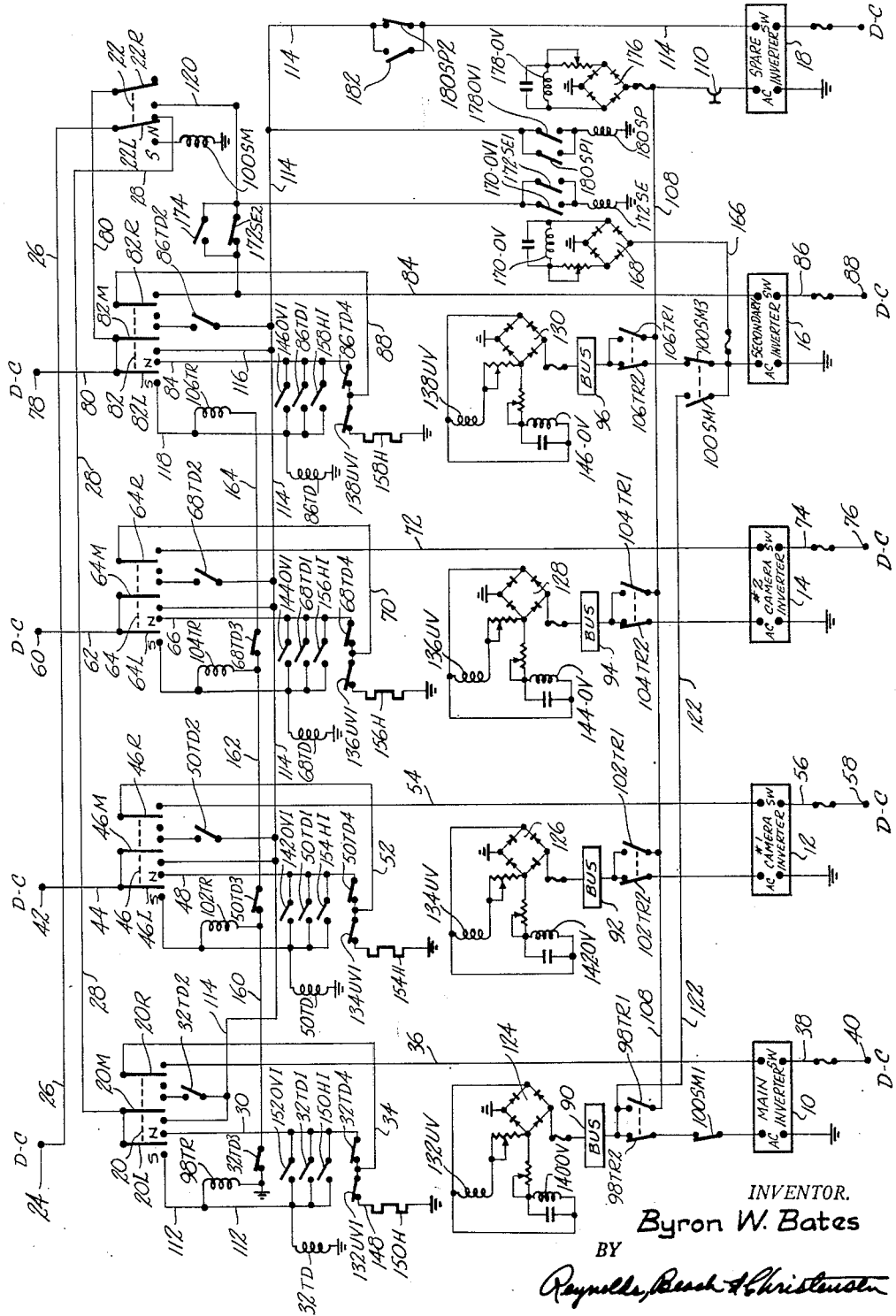

2,694,155

TRANSFER SYSTEM FOR ELECTRIC CIRCUITS

Byron W. Bates, Seattle, Wash., assignor to Boeing Airplane Company, Seattle, Wash., a corporation of Delaware Application August 11, 1952, Serial No. 303,753

25 Claims. (Cl. 307—64)

This invention relates to automatic change-over systems by which, among other operations performed, a failure of the power supply or other normally operative unit in one section of the system causes that unit to be disconnected from the system and a spare unit to be substituted in its place, and if there happens to be a failure in more than one section of the system at the same time then the substitute unit will automatically replace the unit which is of greatest importance or highest priority in carrying out the functions of the over-all system. The invention is herein illustratively described by reference to the preferred form thereof as applied to an airplane electric power distribution system having a plurality of inverters supplying direct current to a corresponding number of separate busses which feed individual loads of varying importance to the airplane's operation. However, it will be appreciated that certain changes and modifications departing from the specific illustration may be made while remaining within the scope and purposes of the invention as herein disclosed.

In brief, the electrical system involved in the illustration employs inverters for converting direct current into alternating current and, through busses, supplying the latter to a variety of different airplane components. These components are classified in a certain consecutive order of priority to receive electrical power in the event there is an insufficient supply for all, caused, for instance, by failure of one of the inverters. In the illustration there are four such groups or classes, although the number may vary in different applications of the invention without changing the principles of operation involved. The first group of the four mentioned in the example, in order of priority, is termed the "main" group, consisting of those components, such as flight instruments and other vital devices of highest relative importance to the airplane's operation. The group or type second in priority in the particular illustration is referred to as the "No. 1 camera," and the group of third highest importance, the "No. 2 camera." Of lowest importance and priority is the group herein termed the "secondary" group, comprising one or more components which are least necessary and would be the first to be dropped out of operation in an emergency. In carrying out the invention the electric power distribution system is sectionalized, such that each class of components is separately energized by its individual inverter and associated D.-C. bus. In addition, a spare inverter is provided.

In the operation of the system this spare inverter is substituted automatically for any one of the four inverters mentioned when any of them fails, and, as a highly important feature, the control circuits effecting the substitution are so constituted that the spare inverter always replaces the inverter of highest priority among all that have failed regardless of whether or not the spare is already substituting for another inverter of lower priority. In achieving this result, the system comprises separate change-over or transfer relays associated with the respective inverters. When the relay of one inverter is actuated to effect a change-over connection, a disabling means associated with that inverter is also actuated, and prevents subsequent actuation of the transfer relays of all lower priority inverters. Preferably these disabling means comprise switches interposed in common energizing circuit conductors for the different transfer relays, as will be more fully described hereinafter.

Moreover, the secondary inverter (that of lowest priority) may be switched by manual control into the place of the main inverter when the latter fails, and the spare will then automatically substitute for the secondary, but as a result of the automatic action just described the spare is still available as an automatic substitute for either of the two camera inverters should either of them fail.

Provision is also made for switching the spare inverter by manual control to substitute for any of the normally operative inverters, and in this case the priority sequence connections of the system insure that the spare may always be substituted manually for an inverter of higher priority than one for which it happens to be substituting at the time of change-over. That is, the manual change-over controls for switching from any inverter to the spare effectively override the similar controls of lower priority inverters.

As an incidental feature, auxiliary control means in the system furnish over-voltage protection for the bus being supplied by either the secondary inverter or the spare inverter, when either of such inverters is substituting for the inverter normally supplying that bus, and when the normal over-voltage protection apparatus of that bus is therefore ineffectual. Provision is also made for optionally nullifying the effect of this auxiliary over-voltage protection apparatus when desirable, as when operating under conditions wherein no other source of power is available than the substituted spare or secondary inverter, for a particular bus, and it is more important to have a faulty supply of power available for that bus than no supply of power at all.

Furthermore, provision is made insuring against the possibility of parallel operation of a failed inverter and a substitute inverter on the same bus, such provision including a transfer relay which has one set of contacts operable to disconnect the failed converter from the bus and another set operable simultaneously to connect the substitute inverter to the same bus, said two sets of contacts being mechanically interconnected so that they cannot fail to operate except together. Moreover, the two sets of contacts are located immediately adjacent the bus in a physical sense so that the connections between the contacts and the bus will be as short as possible and thereby normally isolate the bus from the sometimes long feed conductors extending therefrom to remotely located inverters. Thus the individual sections of apparatus associated with the different busses are rendered less vulnerable to bus grounding hence loss of a section of components, due to bullets or shrapnel, for example, than they would otherwise be.

Another advantage of the disclosed priority change-over system lies in its application without regard to the number of sections each with an inverter and associated bus. Sections may be added to a basic system without disturbing the existing circuit connections appreciably, especially if the added inverters are to have successively lower priority than the existing inverters. Little revision in the connections is necessary even in modifications wherein the priorities are to be changed around.

While systems have previously been available for switching between a normal power supply and a spare power supply, without regard to the possibility of substituting a secondary power supply for the normal power supply by separate switching action, such systems, particularly the one replaced by the present system, have lacked priority type switching arrangements, and have involved an unduly large number of relays and circuit breakers, which add to the weight and bulk of the apparatus. Moreover, the former system afforded no protection against the parallelism of inverters, one a failed inverter, on the same bus, which would result in the substitute inverter acting as a power source driving the other inverter as a motor with attendant loss of electrical power. The former system also presented certain other difficulties such as the possibility of indefinite cycling in the control switches causing the normal inverter and the spare inverter to be started and stopped repeatedly in alternate fashion, with attending high surge currents, if neither failed to operate normally.

An incidental disadvantage of the former system replaced by the present system was the necessity of first starting the main inverter, for example, before it was possible to replace it with the secondary inverter. These difficulties and others of the former system have been overcome in the present system.

The foregoing and other features, objects and advantages of the improved transfer system for electric circuits will become more fully evident from the following description by reference to the accompanying drawing.

The drawing constitutes a schematic circuit diagram of the illustrative power circuit for airplanes embodying the selective transfer system of the present invention.

In order to simplify the circuit diagram and enable visualizing the various circuit operations more readily, the common expedient of separating relay contacts from their associated relay coils in the diagram is adopted. For instance, all those contacts bearing the respective notations TR or TD with a certain prefix number, for example, correspond physically to the relay coils having the same notations and prefix number. Thus the one relay 32TD has a field coil of the same designation and four sets of contacts, designated 32TD1, 32TD2, 32DT3 and 32TD4 located at different points in the diagram. A similar scheme of notation also applies to the other relays.

Referring to the diagram, there are four normally operative inverters, the main inverter 10, the No. 1 camera inverter 12, the No. 2 camera inverter 14, and the secondary inverter 16. There is also a spare inverter 18, which is normally inoperative. Each of these five inverters is placed into operation by the application of D.-C. voltage to its switch terminals labeled SW in conventional fashion. In an airplane system of modern design this voltage is 28 volts D.-C. Application of D.-C. voltage to the main inverter 10 occurs by moving the gang switch 20 into its right-hand position labeled N, and doing likewise with gang switch 22, thereby forming a circuit initiating operation of that inverter extending from D.-C. source terminal 24, and through conductor 26, switch arm 22L, conductor 28, switch arm 20L, conductor 30, the normally closed contacts 32TD4 of relay 32TD, conductor 34, switch arm 20R, conductor 36, and conductor 38 to an internal contactor coil (not shown) of a conventional nature within the inverter, and then to a ground connection (not shown). When that circuit is formed and the contactor coil energized the latter effects closure of an inverter motor energizing circuit drawn only in part as extending from D.-C. terminal 40 to one of the SW terminals of the inverter.

In like manner the No. 1 camera inverter may be started when its control coil (not shown) is energized with D.-C. voltage applied through the circuits extending from the D.-C. terminal 42, conductor 44, the middle arm 46L of switch 46 in the N position of such switch, conductor 48, the normally closed contacts 50TD4 of relay 50TD, conductor 52, gang switch arm 46R, conductor 54, and conductor 56, to the control coil and then to ground. Inverter motor current is then established from terminal 58 of the D.-C. energy supply source as in the previous instance.

Operation of No. 2 camera inverter 14 is similarly initiated through the control circuit extending from D.-C. terminal 60, through conductor 62, switch arm 64L of gang switch 64 in its "N" (normal) position, conductor 66, the normally closed contacts 68TD4 of relay 68TD, conductor 70, switch arm 64R, conductor 72, and conductor 74 to the control coil inside the inverter and then to ground. Terminal 76 of the D.-C. energy supply source is connected to the inverter motor by energization of such control coil (not shown).

Secondary inverter 16 is operated by completion of the control circuit extending from D.-C. terminal 78 and through conductor 80, the arm 82L of relay 82 in its "N" position, conductor 84, the normally closed contacts 86TD4 of relay 86TD, conductor 88, switch arm 82R, conductor 84, and conductor 86, to the inverter control coil (not shown) and then to ground. Terminal 88 of the D.-C. energy supply source is connected to the inverter motor as in the preceding instance.

The circuit connections and conductors for energizing the spare inverter 18 will be described subsequently. Normally this inverter is deenergized as previously mentioned.

Energization of the four normally operated inverters, 10, 12, 14 and 16, produces A.-C. voltage across the inverter terminals designated A.-C., and this voltage is applied to their respective load busses 90, 92, 94 and 96 for distribution to the various components (not shown) involved in operating the particular airplane and its related equipment. The bus 90 is connected to the A.-C. terminals of main inverter 10 through the normally closed contacts 98TR2 of transfer relay 98TR, and the normally closed contacts 100SM1 of relay 100SM (upper right of diagram). A. C. voltage from the No. 1 camera inverter 12 is applied to bus 92 through the normally closed contacts 102TR2 of transfer relay 102TR. Similarly, A.-C. voltage from the No. 2 camera inverter 14 is applied to the bus 94 through the normally closed contacts 104TR2 of transfer relay 104TR. The bus 96 receives A.-C. voltage from secondary inverter 16 through the normally closed contacts 106TR2 of transfer relay 106TR, and the normally closed contacts 100SM3 of relay 100SM previously mentioned.

The A.-C. voltage from spare inverter 18, when that inverter is energized, is available to all the four busses from feed conductor 108 having a circuit breaker 110 therein to protect the spare inverter. The conductor 108 extends to the physical location of each bus, although is normally disconnected therefrom. The normally opened TR relay contacts 98TR1, 102TR1, 104TR1 and 106TR1, are provided to connect the feed conductor 108 to the respective busses 90, 92, 94 and 96 in selective manner as later described.

A desirable feature of construction of the system is the physical location of the TR relays immediately adjacent the busses with which their respective contacts are operatively associated. Normally these busses are located behind spars or other protective structural elements of an airplane where they are less vulnerable to battle damage, and they are therefore located remotely from the inverters which supply them with energy. As a result, long feed conductors are necessary from the inverters to the busses. If the relay contacts for switching these busses on and off their respective supply inverters were located at the inverter ends of the feed conductors instead of at the bus ends of such conductors, then the busses would be effectively extended in length, and the extensions would not be as easily shielded behind spars and other structural elements as are the busses. Thus the possibility of grounding of the feed conductors due to battle damage in that event would constitute a corresponding hazard to the operation of components connected to the bus. Consequently the TR relay contacts mentioned are placed in the immediate vicinity of the respective busses which they serve in switching between different feed conductors to energize such busses.

Another incidental but important feature relating to the TR relays is the provision of a mechanical connection or interlock between the two sets of contacts, namely the contacts TR1 and TR2, of each TR relay, so that when one set of contacts shifts position, the other set is necessarily caused to shift in the opposite sense. As a result there is no possibility of connecting the spare inverter feed conductor 108 through the associated TR1 contact to a bus at the same time that bus is also connected to its normal inverter through the corresponding TR2 contact. This avoids the loss of power and other hazards of having two inverters, one a possibly damaged inverter which has failed, operating in parallel, such that the spare inverter drives the other inverter as an A.-C. motor.

In order to effect a substitution of the spare inverter 18 for either of the four nomally operative inverters, it is necessary in the operation of the system to perform three operations, first energize the spare inverter, secondly, disconnect the normally operative inverter from its bus, and, thirdly, connect the spare inverter A.-C. feed conductor 108 to that bus. These operations need not occur necessarily in the order enumerated. There are two available ways in the system to accomplish the change-over, one being by manual control exercised through selective operation of the respective gang switches 20, 46, 64, or 82, and the other being by automatic operation, initiated, for example, by failure of an inverter causing an over-voltage or under-voltage condition on its bus. Both avenues of controlling the substitution of the spare inverter for any of the other inverters involve the energization of the TR relay associated with the failed inverter. The manual method of effecting the substitution will be discussed first, and then the automatic method.

In order to substitute spare inverter 18 for main inverter 10, for example, by manual control, the gang switch 20 is moved to its left-hand position designated S. This applies the D.-C. voltage of conductor 28 to the coil of relay 98TR, through switch arm 20L and conductor 112, and thereby effects opening of relay contacts 98TR2 and simultaneous closing of relay contacts 98TR1, to disconnect the main inverter 10 from bus 90 and connect the spare inverter 18 to that bus. While the foregoing takes place the D.-C. voltage of conductor 28 is also applied through switch arm 20M and conductor 114 to the SW terminals of the spare inverter to place that inverter in operation as desired.

In similar fashion it is possible to substitute the spare inverter by manual control for any of the other inverters. In the case of the secondary inverter 16, this is accomplished by shifting the gang switch 82 to its left-hand position designated "S." When that takes place, the D.-C. voltage of conductor 80 is applied to the SW terminals of the spare inverter through the switch arm 82M, conductor 116 and conductor 114. At the same time this voltage is also applied by switch arm 82L to the coil of relay 106TR through conductor 118 to effect reversal in the positions of relay contacts 106TR1 and 106TR2, and thereby connect feed conductor 108 to bus 96 and disconnect that bus from the secondary inverter 16. In like manner shifting of the gang switches 46 or 64 to their "S" positions effects substitution of the spare inverter for the inverters 12 or 14, respectively. As will later appear herein, the switch 20 has overriding effect on switches 46, 64 and 82 for that purpose, as does switch 46 over switches 64 and 82, and as does switch 64 over switch 82, due to the action of certain disabling switches (i. e. relay contacts 32TD3, 50TD3 and 68TD3).

It is also possible by manual control to substitute the secondary inverter 16 for the main inverter 10, although there is no provision for automatically doing this, nor is there provision in the example for substituting the secondary for either the No. 1 camera or No. 2 camera inverters.

In order to accomplish the substitution of the secondary for the main inverter, by manual control, gang switch 22 is shifted to its left-hand position, designated "S," which applies the D.-C. voltage of conductor 80 to the SW terminals of the secondary inverter through the switch arm 22R, conductor 120 and conductor 84. This switching action also applies the D.-C. voltage of conductor 26 to the coil of relay 100SM, through switch arm 22L, and when this relay is energized it opens its contacts 100SM1 (lower left) to disconnect the main inverter 10 from the bus 90 and simultaneously opens its 100SM3 contacts to disconnect the secondary inverter 16 from its normal bus 96, while closing the 100SM2 contacts to connect the secondary inverter to the bus 90 through feed conductor 122. Thus the main inverter 10 has available to it the secondary inverter 16 as one possible substitute, and as later described, the main inverter also has available to it, as do the remaining three normally operative inverters, the possibility of automatic or manual substitution of the spare inverter 18 therefor in the event of a failure of the particular inverter.

As previously mentioned, the system also provides for the automatic substitution of the spare inverter 18 for any of the four other inverters when an under-voltage or an over-voltage condition develops on the bus of a particular inverter. The circuit components and connections by which these results are accomplished will now be described.

The over-voltage and under-voltage sensing elements in the illustrative case are energized by D.-C. voltage. To this end the bridge-connected rectifiers 124, 126, 128 and 130, are connected to the respective busses 90, 92, 94 and 96. The coils 132UV, 134UV, 136UV and 138UV are connected across the output potential points of the respective rectifiers and have variable compensating or adjusting resistors (not labeled) in series with them in order to establish their drop-out voltages at the desired values. Similarly, the over-voltage relay coils 140OV, 142OV, 144OV and 146OV are likewise connected across the output potential points of the respective rectifiers, each such coil having a variable compensating or adjusting resistor by which the actuating voltage of the relay energizing circuit may be established and adjusted to the desired value. A condenser C connected across each such over-voltage relay coil prevents tripping of such relays due to momentary circuit transients which do not represent a fault condition. Preferably all over-voltage relays used in the system are of the inverse time-voltage type.

The contacts 132UV1 of under-voltage relay 132UV are interposed in conductor 148 between the normally energized conductor 34 and the heater element 150H of a thermally actuated switch having contacts 150H1 connected between conductors 30 and 112. Under normal operating conditions contacts 132UV1 are open, so that the heater element 150H is deenergized and its associated contacts 150H1 are open. The over-voltage relay 140OV has a set of contacts 152OV1 which are likewise connected between conductors 30 and 112, and these contacts are also normally open. In addition, the contacts 32TD1 of relay 32TD are also connected between conductors 30 and 112, and these likewise are normally open. It will be apparent that closure for any reason of either of these three sets of contacts, namely 150H1, 32TD1 or 152OV1, will apply the D.-C. voltage on conductor 30 to the coil of relay 98TR through conductor 112.

The same possibility exists in connection with the section of system associated with the No. 1 camera inverter 12, and likewise those sections associated with the No. 2 camera inverter 16 and the secondary inverter 16, respectively. Thus the sets of contacts 134UV1, 136UV1, and 138UV1 of the respective inverter sections are adapted to apply D.-C. voltage from the respective normally energized conductors 52, 70 and 88 to the respective heating elements 154H, 156H and 158H of thermally actuated switches having contacts H1 bearing corresponding prefix numerals in the diagram. The heater switch contacts 154H1, 156H1 and 158H1, normally open, are connected between conductors in the respective inverter surface sections ismilar to conductors in the section of circuit already described in connection with the main inverter 10, and to the same effect with respect to the energization of the respective TR relay coils 102TR, 104TR and 106TR.

In addition, the relays 32TD, 50TD, 68TD and 86TD have correspondingly numbered contacts TD2, which are interposed in the conductors interconnecting the spare inverter energization conductor 114 with the "N" contacts of the middle switch arms 20M, 46M, 64M, and 82M of the respective manual cntrol switches, so that when these switches are in the normal or "N" position energization of a TD relay effecting closure of the corresponding TD2 contacts will apply D.-C. voltage through conductor 114 to the SW terminals of the spare inverter.

The TD relays 32TD, 50TD, 68TD and 86TD also have correspondingly numbered contacts TD3. The contacts 32TD3 are connected in the ground return conductor 160 for all three relay coils 102TR, 104TR and 106TR. The contacts 50TD3 are interposed in the ground return conductor 162, connected to conductor 160, for the two relay coils 104TR and 106TR; and contacts 68TD3 are similarly interposed in the ground return conductor 164, connected to the conductor 152, for the single relay coil 106TR. Normally these contacts are closed. These TD3 contacts and their connections as described produce the desired priority sequence operation of the system as will be pointed out subsequently in greater detail.

The TD relays 32TD, 50TD, 68TD and 86TD also have correspondingly numbered contacts TD4 and these normally closed contacts are interposed in the circuit conductors which carry D.-C. voltage from the contacts N of the leftmost switch arms 20L, 46L, 64L and 82L of the respective switches bearing corresponding identifying numbers, to the rightmost contact N of the respective switch arms 20R, 46R, 64R and 82R, furnishing a current path for normal energization of the associated inverters.

The operation of the described circuits by which any of the four inverters, 10, 12, 14 or 16, is automatically replaced by the spare inverter in the event of an over-voltage or under-voltage condition of the impaired section of the system is basically the same in each instance, and it will be sufficient for that reason to describe the operation of substituting the spare inverter for the main inverter 10 under these conditions.

Assuming an over-voltage condition which persists long enough to charge the condenser across the coil of relay 140OV and actuate that relay, the relay contacts 152OV1 will close and relay coil 98TR will be energized through conductors 30 and 112 thus connected in series. Such action reverses the existing positions of the relay contacts 98TR1 and 98TR2 in order to switch the spare inverter feed conductor 108 to the bus 90 in place of the normal (unnumbered) feed conductor from the main inverter 10. At the same time, the spare inverter is energized by closure of the contacts 32TD2 establishing an inverter energizing circuit through the switch arm 20M and conductor 114. When contacts 152OV1 closed in order to energize relay coil 98TR they simultaneously energized relay coil 32TD, because the two coils are connected in parallel. Thus, the spare inverter 18 is energized through contacts 32TD2 at virtually the same instant that the spare inverter feed conductor 108 is switched to the bus 90 in place of the main inverter feed conductor formerly extending through contacts 98TR2. Thus a persistent overvoltage condition which actuates the over-voltage relay 140OV automatically substitutes the spare inverter for the main inverter 10 supplying the bus 90.

The spare inverter may be removed from the main inverter bus thereafter by moving the switch 20 out of its "N" position to a neutral position, causing deenergization of relay 32TD and thereby of relay 98TR, whereby the latter's contacts reverse position. Thereupon the switch 20 may be moved to the "S" position to substitute the spare manually for the main inverter, or the switch 20 may be moved back to the "N" position. If the latter is done, one of two results is possible, either the main inverter will operate normally, with its fault corrected, or else the former over-voltage condition will still exist and the spare inverter will again be substituted for it automatically in the manner previously described.

In case of an under-voltage condition on the bus 90 causing the under-voltage relay 132UV to drop out and thereby close its contacts 132UV1, heating current flows in the heating element 150H. A certain period of time is required for heating the element 150H to a temperature sufficient to actuate and close the associated contacts 150H1, thus allowing time for the under-voltage condition to correct itself, if it will, before there is a response causing change-over of inverters. This delay is desirable, as there are various reasons in the operation of an electrical system of this nature why an under-voltage (or no voltage) condition may exist for a brief instant without its being caused by a failure.

When contacts 150H1 do close, they form an energizing circuit for both relays 32TD and 98TR, with the effects previously described with reference to a main inverter over-voltage condition, namely the energization of the spare inverter 18 and the switching of its feed conductor 108 to the bus 90 in place of the normal feed conductor from the main inverter 10. In addition, however, energization of the relay 32TD causes opening of the contacts 32TD4 and thereby removes the source of voltage causing heating of the element 150H, so as to avoid prolonged heating periods of the latter tending to produce deterioration thereof. The contacts 150H1 then reopen, but this does not deenergize the relays 32TD and 98TR, however, because the relay 32TD is a holding relay provided with contacts 32TD1, in parallel with the contacts 150H1. As in the case of an over-voltage condition, the substitution of the spare inverter for the main inverter due to under-voltage on bus 90 is in effect a permanent substitution, which remains until the switch 20 is moved out of its "N" position to the neutral position.

When the secondary inverter 16 is substituted by manual control for the main inverter 10, the opening of contacts 100SM3 attending the switching operation necessarily removes voltage from the secondary inverter bus 96. This removal of voltage from the bus is, of course, the equivalent of an under-voltage condition during normal operation of the secondary inverter when connected to that bus. Consequently, the under-voltage relay 138UV responds as if to an under-voltage condition, and causes actuation of the relays 86TD and 106TR so as to effect substitution of the spare inverter 18 for the secondary inverter as a source of energy for the bus 96. Thus the spare inverter automatically moves up to the position of the secondary inverter 16 when the latter is moved up by manual switching operation (switch 22 to position "S") to the position of the main inverter 10. However, because of the priority sequence connections in the system, as later described, the spare inverter is still available to substitute for the No. 1 or No. 2 camera inverter. For that reason, if the main inverter fails and the spare moves "up" to its place, it will usually be desirable to open switch 20 (i. e. move it to a neutral position) and disconnect the spare inverter from bus 90, while moving switch 22 to the "S" position and thereby substitute the secondary inverter in place of the spare inverter as a supply for main bus 90. The spare then automatically becomes connected to the secondary bus 96.

While the secondary inverter 16 may be replaced automatically by the spare inverter 18 when the secondary inverter is disconnected from its own bus 96 by opening of the normally closed contacts 106TR2 and 100SM1, the spare will not substitute for the main inverter while the secondary is connected to the main inverter bus 90 by operation of switch 22 and relay 100SM. The reason for this will become evident by noting that the relay 98TR1 may not be energized to close contacts 98TR1 while secondary inverter 18 is on the bus 90, due to the position "S" of switch 22.

In order to furnish over-voltage protection for the secondary inverter when the latter is disconnected from its own bus 96 and associated over-voltage protection controls, and is connected to the main inverter bus 90, a separate over-voltage responsive circuit is connected to the output of the secondary inverter through the conductor 166. This separate over-voltage responsive circuit comprises the bridge-connected rectifier 168 energizing the over-voltage relay 170, having a condenser C connected across its winding and a variable resistor connected in series with its winding in order to establish the critical actuating voltage of this relay. This over-voltage relay has a set of contacts 170OV1 which are normally open, and when closed by an over-voltage condition at the output of the secondary inverter effect energization of the relay 172SE from the conductor 120, which in turn is energized through switch arm 22R when the secondary inverter is switched manually into the position of substituting for the main inverter. Relay 172SE is a holding relay having contacts 172SE1 connected in parallel with the over-voltage relay contacts 170OV1. A second set of contacts 172SE2 of the holding relay are interposed in the conductor 120 which energizes the secondary inverter, and these normally closed contacts are opened when an over-voltage condition exists on conductor 166 causing the over-voltage 170OV to be actuated. A nullifying switch 174 connected across the relay contacts 172SE2 is provided for the purpose of restoring the secondary inverter to operating condition despite an over-voltage condition at its output, and this would be done in the event of an emergency when the secondary inverter is essential, even though operating with excessive output voltage.

The same type of separate over-voltage control for the spare inverter is provided by the bridge-connected rectifier 176, over-voltage relay 178OV having contacts 178OV1, and the holding relay 180SP having contacts 180SP1 connected in parallel with the contacts 178OV1. A separate set of contacts 180SP2 interposed in the energization conductor 114 of the spare inverter removes the energizing voltage from this inverter when an over-voltage condition exists at its output, as in the case of the secondary inverter over-voltage control operation. A nullifying switch 182 connected across the contacts 180SP2 is provided in the event it is desirable in case of emergency to remove the over-voltage protection provided to the spare inverter.

Reference has been made to the presence of TD relay contacts 32TD3, 52TD3 and 68TD3 in the ground return conductors for the various TR relays. These relay contacts have the purpose of insuring that the spare inverter will be substituted automatically for the failed inverter of highest priority, should there be two or more normally operative inverters under failure at the same time and both requiring replacement. These contacts and their circuit connections also insure that a person may substitute the spare inverter for any inverter of higher priority than that, if any, for which the spare had already been substituted, whether manually or automatically. This the operator accomplishes by moving the gang switch of the desired high priority inverter to position "S." The operation of the TD3 contacts to achieve those ends will now be described.

It will be noted first of all that the substitution of the spare inverter for the main inverter, for example, is effected, among other things, by energization of the relay 32TD. Thus when this substitution is made the relay contacts 32TD3 are opened. This opens the common ground return conductor 160 for the relays 102TR, 104TR and 106TR associated, respectively, with the No. 1 and No. 2 camera inverters and the secondary inverter. Thus while the spare inverter is substituting for the main inverter, it is impossible for any of these latter three relays to be energized by operation of the automatic over-voltage and under-voltage controls of their associated circuit sections. This is as it should be, of course, because the main inverter has the highest priority of all.

Should the No. 1 camera inverter, for example, fail before the main inverter fails, so as to cause automatic substitution of the spare inverter for the No. 1 camera inverter, then the attending opening of the contacts 50TD3 in ground return conductor 162 for the relay coils 104TR and 106TR interrupts the ground return lead for these relays and prevents failure of the No. 2 camera inverter or the secondary inverter from disturbing the connections of the spare inverter to the No. 1 camera inverter bus 92. However, should the main inverter suffer a fault while the spare is substituting for the No. 1 camera inverter, operation of the under-voltage relay 132UV or the over-voltage relay 140OV will energize relay 32TD. Contacts 32TD1 are thereby closed to energize relay 98TR, which connects the spare inverter feed conductor to the bus 90. Simultaneously therewith contacts 32TD3 open, thus breaking the energizing circuit conductor 160 for relay 102TR. With relay 102TR deenergized, contacts 102TR1 open and disconnect the No. 1 camera inverter from the bus 92, leaving the spare inverter 18 connected only to the main bus 90. Thus failure of the main inverter, automatically causes the spare to move "up" to its position from the lower priority position of the No. 1 camera inverter.

By similar action, if the spare inverter is substituting for the secondary inverter, and there is a failure of any one of the higher priority inverters 10, 12 or 14 the spare will move "up" automatically to take its place. Likewise if the spare inverter is substituting for the No. 2 camera inverter, then only a failure of the main inverter or the No. 1 camera inverter can draw the spare inverter to their respective busses, and failure of the lower priority secondary inverter will not disturb the spare inverter's connection to the No. 2 camera bus 94.

As manual substitution of the spare for any other inverter requires energization of the appropriate TR relay, effected by moving the corresponding switch 20, 46, 64 or 82 to the "S" position, the TD3 contacts insure, as in the case of automatic operation described above, that the spare inverter may always be substituted manually for one inverter in preference to all others of lower priority in the system.

There is thereby provided a priority change-over system wherein failure in one section of the system actuates a disabling switch individual to it and thereby prevents the connection of the spare inverter to any lower priority section without preventing its substitution for one of higher priority.

Having thus described the invention relating to transfer systems with reference to the preferred form, it will be appreciated that a number of equivalent arrangements as well as modifications or changes in the existing arrangement may be made without departing from the underlying features comprising the patentable subject matter, as defined in the appended claims.

I claim as my invention:

1. A transfer priority electrical distribution system comprising a plurality of normally operative power supply units operatively connected in associated sections of circuit apparatus individual to said units respectively, said apparatus sections having a predetermined order of priority for connection to a spare power supply unit, a spare power supply unit normally inoperative adapted to substitute for any of said normally operative units, a plurality of transfer relays individual to the respective apparatus sections and each controlled by its section and arranged to substitute said spare unit for the unit associated with such relay automatically in response to an abnormal voltage condition of the related apparatus section, and disabling switch means controlled by the high priority apparatus section to prevent spare unit substituting operation of the transfer relays of lower priority sections, automatically substantially concurrently with the operation of said high priority section transfer relay.

2. The system defined in claim 1, wherein the transfer relays of the lower priority sections have separate energizing circuits for such relays but include a common conductor for the energizing currents of all such relays, and the switch means is interposed in said conductor to interrrupt or prevent flow of energizing current in any such relay upon operation of such switch means concurrently with the operation of the higher priority section transfer relay.

3. The system defined in claim 1, and manually controlled transfer switch means including a normally closed switch in the operating connections between the high priority section power supply unit and its associated apparatus section, circuit connections and a related normally open switch between the high priority section and a lower priority section power supply unit, and a switch in the operating connections between said lower priority section unit and its associated apparatus section, operation of said switch means disconnecting said units from their respective sections and substantially simultaneously substituting said lower priority section unit for said high priority section unit, whereby the transfer relay of said low priority section automatically substitutes the spare unit in such latter section in response to the removal of normal voltage for such section.

4. The system defined in claim 1, comprising at least three apparatus sections and associated normally operative power supply units, said sections having a successive order of priority, with the disabling switch means being controlled by the highest priority apparatus section of the three and operating to prevent operation of the remaining two apparatus section transfer relays, and a second disabling switch means controlled by the intermediate priority apparatus section of the three and arranged to prevent operation only of the transfer relay of the lowest priority apparatus section of the three.

5. The system defined in claim 4, wherein the transfer relays of the intermediate and lowest priority sections of the three have separate energizing circuits for such relays but include a common conductor for the energizing currents of both such relays, and the first disabling switch means is interposed in such common conductor to permit interrupting or preventing flow of energizing current in either such relay, while the second disabling switch means is interposed in a portion of the separate energizing circuit for said lowest priority section relay removed from said common conductor, to interrupt or prevent flow of energizing current in the transfer relay of such latter relay.

6. The system defined in claim 4, and manually controlled transfer switch means including a normally closed switch in the operating connections between the highest priority section power supply unit and its associated apparatus section, circuit connections and a related normally open switch between the highest priority section and the lowest priority section power supply unit, and a switch in the operating connections between said lowest priority section unit and its associated apparatus section, operation of said switch means disconnecting said units from their respective sections and substantially simultaneously substituting said lowest priority section unit for said highest priority section unit, whereby the transfer relay of said lowest priority section automatically substitutes the spare unit in such latter section in response to the removal of normal voltage from such section.

7. A transfer priority electrical system comprising a plurality of normally operative units operatively connected in associated sections of circuit apparatus individual to said units respectively, said apparatus sections having a predetermined order of priority for connection to a spare unit, a spare unit normally inoperative adapted to substitute for any of said normally operative units, a plurality of transfer relays individual to the respective apparatus sections and each controlled by its section and arranged to substitute said spare unit for the unit associated with such relay automatically in response to a predetermined abnormal operating condition of the related apparatus section, and switch means controlled by the high priority apparatus section and controlling the transfer relays of lower priority sections, said switch means being operable substantially simultaneously with the operation of said high priority section transfer relay, and thereupon preventing operation of said lower priority section transfer relays, thereby preventing substitution of said spare unit for any of said lower priority section units when said higher priority section unit requires such substitution.

8. A transfer priority system comprising a plurality of normally operative units operatively connected in associated sections of apparatus individual to said units respectively, said apparatus sections having a predetermined order of priority for connection to a spare unit, a spare unit normally inoperative adapted to substitute for any of said normally operative units, a plurality of transfer devices individual to the respective apparatus sections and each controlled by its section and arranged to substitute said spare unit for the unit associated with such device automatically in response to a predetermined abnormal operating condition of the related apparatus section, and disabling means controlled by the high priority apparatus section and arranged to prevent substitution of said spare unit for lower priority sections by operation of the transfer devices of such latter sections, said disabling means being operable with the operation of said high priority section transfer device.

9. The system defined in claim 8, comprising at least three apparatus sections and associated normally operative units, said sections having a successive order of priority, with the means being controlled by the highest priority apparatus section of the three and operating to prevent operation of the remaining two apparatus section transfer devices, and a second disabling means controlled by the intermediate priority apparatus section of the three and arranged to prevent operation only of the transfer device of the lowest priority apparatus section of the three.

10. An electrical distribution system comprising a plurality of feeder busses supplied respectively by separate inverters normally connected thereto, a spare inverter adapted to substitute for any of said normal inverters, a plurality of transfer relays operable to substitute said spare for said normal inverters, respectively, automatic relay energizing means controlling the relays associated with said normal inverters respectively and controlled in turn by voltage of the busses of such inverters to effect energization of such relays individually and thereby substitute the spare inverter for any of such latter inverters automatically in response to an abnormal voltage condition on its bus, and switch means operable by manual control to substitute one of said normal inverters for a particular one thereof.

11. The system defined in claim 10, and disabling means operable to prevent actuation of the respective transfer relays of all of the normal inverters except that of the particular inverter last mentioned, said disabling means being arranged to operate automatically with substitution of the spare inverter for said particular inverter, and thereby give precedence thereto.

12. The system defined in claim 10, comprising at least three busses and associated normal inverters, said busses having a successive order of priority for connection to the spare inverter, with the particular inverter last mentioned being highest, first disabling means operable to prevent actuation of the respective transfer relays of the other two normal inverters and being arranged to operate automatically with substitution of the spare inverter for said highest priority bus inverter, a second disabling means operable to prevent acuation of the transfer relay of the lowest priority bus of the three and being arranged to operate automatically with substitution of the spare inverter for the intermediate priority inverter of the three.

13. An electrical distribution system comprising a plurality of distribution busses, a plurality of independent power supplies individual to the respective busses and normally connected thereto, a spare power supply adapted to substitute for any of said normally connected power supplies, said busses having a successive order of priority for connection to the spare power supply, a plurality of multiple contact transfer relays associated with the respective busses and operable to disconnect any such bus from its normal power supply and to said spare power supply, a plurality of voltage sensitive devices individual to the respective busses, controlling energization of the related transfer relays to effect actuation of any such relay automatically in response to an abnormal voltage condition on its related bus, and thereby substitute the spare power supply for that normally connected to such related bus, said system additionally including disabling means associated with the respective individual busses, except the bus of lowest priority, each such disabling means being controlled by the voltage sensitive means of its particular bus and being arranged and operable to prevent substitution of the spare power supply for that of any other bus of lower priority than that of the bus associated with the particular disabling means.

14. The system defined in claim 13, wherein the disabling means comprise switches interposed in the control circuits of the respective transfer relays.

15. The system defined in claim 14, wherein the energizing circuit of each transfer relay, except that associated with the highest priority bus, has a circuit conductor in common with the energizing circuits only of those respective relays associated with all lower priority busses, and the disabling switch associated with each bus is interposed in said relay energizing circuit conductor of the bus of next lower priority.

16. The system defined in claim 15, and separately controlled switch means arranged for disconnecting the normal power supply of a bus and substituting said power supply for the power supply of a bus of higher priority, thereby removing voltage from said first bus and effecting operation of the related transfer relay to substitute the spare power automatically for the power supply of such first bus.

17. The system defined in claim 13, and separately controlled switch means arranged for disconnecting the normal power supply of a bus and substituting said power supply for the power supply of a bus of higher priority, thereby removing voltage from said first bus and effecting operation of the related transfer relay to substitute the spare power supply automatically for the power supply of such first bus.

18. A system of electric energy distribution comprising a plurality of busses, a plurality of inverters located remotely from said busses and normally connected to the respective busses over normal feed conductors extending from such inverters to such busses, and a spare inverter having a feed conductor extending therefrom to each bus but normally disconnected therefrom, a plurality of transfer relays for the respective busses and physically located at the inverter ends of their associated normal feed conductors, said relays each having a set of normally closed contacts connecting the associated bus to the normal inverter feed conductor and a set of normally open contacts connecting such bus to the spare inverter feed conductor, and voltage sensitive means respectively associated with the individual busses and controlled by the respective voltages thereof, said means in turn controlling the associated transfer relays to actuate such relays automatically in response to abnormal bus voltage and thereby substitute said spare inverter for the particular bus inverter of an abnormally energized bus.

19. The system defined in claim 18, wherein the busses have a successive order of priority for connection to the spare inverter, and one of the inverters normally connected to a bus of relatively low priority has an additional feed conductor extending therefrom to the physical location of a bus of relatively high priority, and remotely controlled switch means having normally open contacts interposed between said additional feed conductor and said relatively high priority bus, and having additional contacts coordinated therewith at said relatively low priority inverter, operable to effect substitution of such inverter for said relatively high priority inverter.

20. The system defined in claim 19, wherein the busses have a successive order of priority for connection to the spare inverter, such system being additionally characterized by the provision of disabling means associated with the respective individual busses, except the bus of lowest priority, each of said disabling means being controlled by the voltage sensitive means of its particular bus and being arranged and operable to prevent substitution of the spare inverter for that of any other bus of lower priority than that of the bus associated with the particular disabling means.

21. The system defined in claim 20, wherein the disabling means comprise switches interposed in the control circuits of the respective transfer relays.

22. The system defined in claim 21, wherein the energizing circuit of each transfer relay, except that associated with the highest priority bus, has a circuit conductor in common with the energizing circuits only of those respective relays associated with all lower priority busses, and the disabling switch associated with each bus is interposed in said energizing circuit conductor of the bus of next lower priority.

23. The system defined in claim 20, and manually controlled means respectively associated with the individual normally operative inverters and arranged to effect actuation of their related transfer relays selectively and thereby substitute the spare inverter for any such normally operative inverter at will.

24. The system defined in claim 18, and manually controlled means respectively associated with the individual normally operative inverters and arranged to effect actuation of their related transfer relays selectively and thereby substitute the spare inverter for any such normally operative inverter at will.

25. An electrical distribution system comprising a plurality of distribution busses, a plurality of independent power supplies individual to the respective busses and normally connected thereto, a spare power supply adapted to substitute for any of said normally connected power supplies, a plurality of multiple contact transfer relays associated with the respective busses and operable to disconnect any such bus from its normal power supply and to said spare power supply, a plurality of voltage sensitive devices individual to the respective busses, controlling energization of the related transfer relays to effect actuation of any such relay automatically in response to an abnormal voltage condition on its related bus, and thereby substitute the spare power supply for that normally connected to such related bus, and a plurality of manually controlled means individual to the respective busses, controlling energization of the related transfer relays to effect actuation of any such relay and thereby substitute the spare power supply for that normally connected to such related bus at will.

References Cited in the file of this patent

UNITED STATES PATENTS

| Number | Name | Date |
|---|---|---|
| 2,442,388 | Wallace et al. | June 1, 1948 |